United States Patent [19]
Swindell

[11] 3,760,232
[45] Sept. 18, 1973

[54] SWITCHRACK FOR ELECTRIC MOTOR STARTERS AND CONTROLS

[76] Inventor: E. Leroy Swindell, 5 E. 51 St., Apt. 3A, New York, N.Y. 10022

[22] Filed: June 16, 1972

[21] Appl. No.: 263,608

[52] U.S. Cl. ............................................. 317/99
[51] Int. Cl. ............................................. H02b 1/04
[58] Field of Search ...................... 317/99, 117, 120

[56] References Cited
UNITED STATES PATENTS

| | | | |
|---|---|---|---|
| 3,633,075 | 1/1972 | Hawkins | 317/120 |
| 3,080,506 | 3/1963 | Minder | 317/99 |
| 3,148,311 | 9/1964 | Conway | 317/120 |

Primary Examiner—J. R. Scott
Assistant Examiner—Gerald P. Tolin
Attorney—E. Leroy Swindell

[57] ABSTRACT

An improved metal switchrack for mounting weatherproof and explosionproof self contained electric motor starters and electric motor controls as they are commonly manufactured and used by the electrical industry; and more particularly, as they are applied to motor control systems of the petroleum industry; chemical industry; and industries using motors and starters which are to be installed in areas surrounded by atmospheres containing hazardous concentrations of flammable gases, combustible dusts, ignitible fibers or flyings.

That which is new is an adaptable and adjustable prefabricated motor switchrack that can be erected at the site of installation which will accommodate mountings of any combination of self-contained electrical motor starters and self-contained electrical motor controls of standard sizes.

An infinite number of combination mountings of switchrack electrical components heretofore described are possible on my switchrack by utilizing an adjustable mounting plate which supports the electric motor starter or electric motor control. The adjustable mounting plate slides horizontally on a predrilled channel to the selected location and the aligning pins engage into the predrilled aligning holes and is clamped into final position by means of an adjustable pressure clamp.

1 Claim, 8 Drawing Figures

PATENTED SEP 18 1973 3,760,232

SWITCHRACK FOR ELECTRIC MOTOR STARTERS AND CONTROLS

BACKGROUND OF THE INVENTION

The specific field of this invention is a metal switchrack on which are mounted explosion proof or weatherproof electric motor starters and electric motor controls.

The equipment which is to be mounted on the instant invention is equipment approved for installation in hazardous areas as defined by well known regulatory agencies, such as the National Electrical Manufacturers Association (N.E.M.A.) Underwriters' Laboratories Inc., (UL) The National Electrical Code (NEC) and the Joint Industry Committee (JIC).

It is well known that the prior switchboard art is limited to a standardized metal switchrack, which has set locations for motor starter mountings.

There is presently no method in the art which would allow for adjusting the mountings arrangements of components on switchracks inasmuch as the mountings are permanently fastened to the structures or components; and adjustment in the field is not possible. The instant invention is limited to a means for mounting self-contained electrical motor starters and self-contained electrical motor controls heretofore described. The metal clad switchgear which is presently in the art (Class 317-120) is for housing electrical motor starters and electrical motor controls which are not self-contained components.

SUMMARY OF THE INVENTION

My invention is an electric motor starter switchrack constructed of metal, used for the mounting of self-contained electric motor starters and controls. The switchrack has a vertical channel member on which an adjustable horizontal member can be raised or lowered. There are adjustable mounting plates thereon which are moveable along the horizontal channel. The final location of a motor starter is accomplished by positioning the mounting plate in accordance with the electrical requirement of a motor system in terms of the number of various sized starters needed. The moveable mounting plates are secured in their final position by means of an adjustable pressure clamp fastened with a cap screw and nut after which the electrical motor starter or electrical component is fastened to the plate.

The obvious advantage of the invention over the prior art is to eliminate the necessity of building custom built motor starter racks to the user's specification hence reducing the attendant high cost which is characteristic of custom manufacturing. My switchrack, which is prefabricated at the factory, can be assembled in the field in a manner which will quickly provide for any arrangement or combination of mountings for self-contained electrical starters or controls.

The problems attendant to last minute design changes by installers of electrical motor starters in the electrical field are minimized when my prefabricated adjustable metal switchrack is used.

BRIEF DESCRIPTION OF THE DRAWINGS

The accompanying drawing shows an embodiment of my invention and modifications of a front view elevation and details of the mounting plate, on which are mounted the starters, channel and clamp.

One detail is of the adjustable mounting plate, which shows a section of channel. Still another detail is an enlargement of the face of the channel showing the numbered position at which the adjustable mounting plate is stationed before it is bolted into final position. A further detail shows a left end elevation of the embodiment, and a fragmentary exploded view of a typical starter adjacent to the mounting plate.

DESCRIPTION OF THE EMBODIMENT

Figure 1:
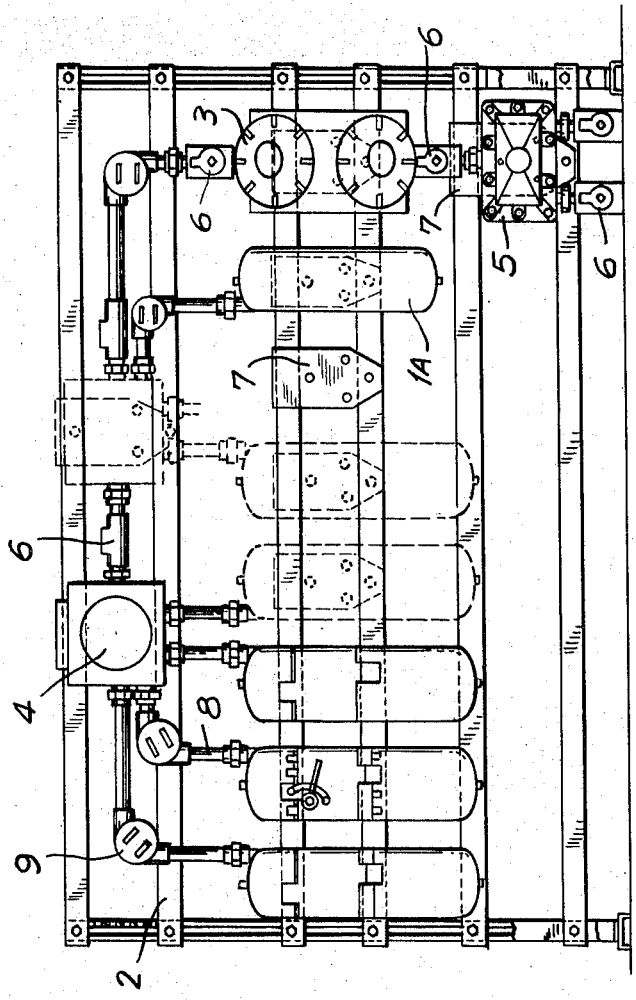

For a better understanding of the nature and object of my invention reference may be taken of the following detailed description of the drawing of the embodiment:

FIG. 1 shows four motor starters 1 mounted on the channel way 2; and two motor starters also mounted in phantom as well as junction boxes 4 shown mounted toward the top of the embodiment. An entrance junction box 5 is shown toward the bottom of the embodiment and seal-off explosion preventative fittings 6 are placed at the required locations on the switchrack.

An adjustable adaptable mounting plate 7 is shown attached to the embodiment and shown without a component mounted for illustrative purposes only. A starter 1A smaller than the five shown embracing the embodiment, is shown adjacent to the main circuit breaker 3 to illustrate the adaptibility of the switchrack to accommodate various sized components.

The mounting plate 7 on which the components are to be mounted, shown mounted on FIG. 1 and the detailed figures, is moveable along the entire channel way 2. The channel way 2 may be drilled with holes marked in a numerical sequence such that, by locating the starters and junction boxes 4, the various conduit nipples 8 and condulets 9 will fall into a configuration approximating FIG. 1.

Figure 2:
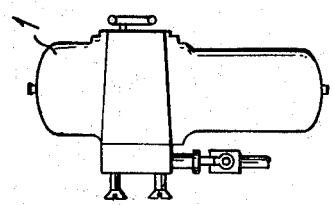

FIG. 2 is a side view of motor starter 1.

Figure 3:
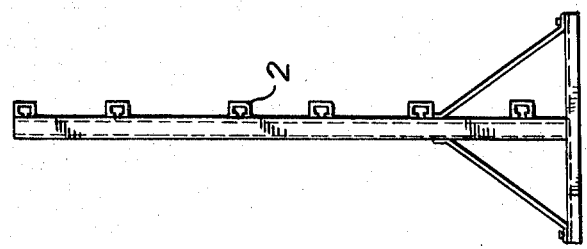

FIG. 3 shows a left end elevation of the embodiment shown without the components being mounted.

Figure 4:
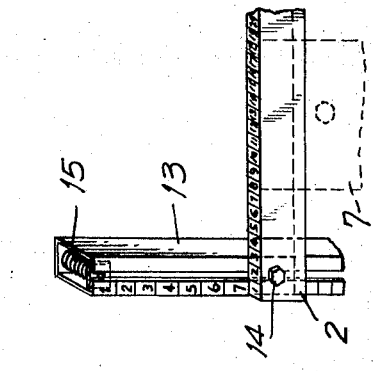

FIG. 4 shows an end view of a mounting plate 7 with a pressure clamp 10 affixed to a portion of channel 2.

Figure 5:
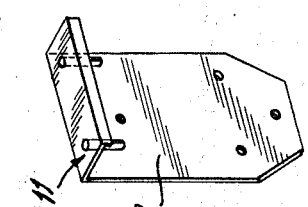

FIG. 5 is an isometric view of the mounting plate 7 affixed to channel 2 with pressure clamp 10 attached with aligning holes 12 shown.

Figure 6:
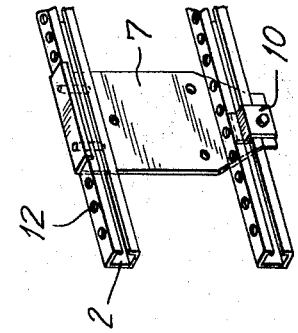

FIG. 6 is a detail of a mounting plate 7 shown with aligning pins 11.

Figure 7:
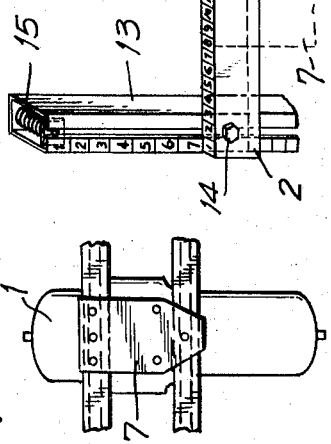

FIG. 7 shows a rear view of a motor starter 1 affixed to mounting plate 7.

Figure 8:
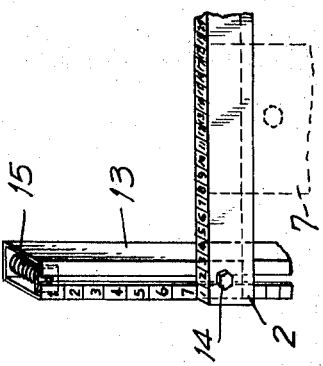

FIG. 8 is a typical front view elevation of a segment of a vertical channel 13 to which is attached a horizontal channel 2. It will be noted that both of the channels 2 and 13 have a numerical number sequence suitably marked into the face and are used for locating mounting plate 7. The horizontal channel 2 is secured to the vertical channel 13 by means of a cap screw 14 and spring nut 15. The horizontal channel 2 is adjusted to the desired spacing location indicated on vertical channel 13.

As my invention I claim:

1. An adjustable switchrack for mounting self-contained electrical motor starter and control components comprising vertically spaced horizontal channels supported on said switchrack, mounting plates carrying said components thereon adjustably and slidably secured between two vertically adjacent channels, said plates having extensions resting on the top portions of the upper one of the adjacent channels, said plates further having adjustable clamp means extending into the channel openings of the lower ones of the adjacent channels, so that said plates and components thereon are slidably adjustable horizontally.

* * * * *